United States Patent
Neuman et al.

(10) Patent No.: US 9,196,080 B2
(45) Date of Patent: *Nov. 24, 2015

(54) MEDIAL AXIS DECOMPOSITION OF 2D OBJECTS TO SYNTHESIZE BINOCULAR DEPTH

(71) Applicant: DISNEY ENTERPRISES, INC., Burbank, CA (US)

(72) Inventors: Robert M. Neuman, Santa Clarita, CA (US); Evan Matthew Goldberg, Glendale, CA (US); Tara Handy Turner, Marina Del Rey, CA (US)

(73) Assignee: DISNEY ENTERPRISES, INC., Burbank, CA (US)

( * ) Notice: Subject to any disclaimer, the term of this patent is extended or adjusted under 35 U.S.C. 154(b) by 338 days.

This patent is subject to a terminal disclaimer.

(21) Appl. No.: 13/903,082

(22) Filed: May 28, 2013

(65) Prior Publication Data

US 2013/0257864 A1    Oct. 3, 2013

Related U.S. Application Data

(63) Continuation-in-part of application No. 12/025,856, filed on Feb. 5, 2008, now Pat. No. 8,471,898.

(51) Int. Cl.
    *G06T 15/08* (2011.01)
    *H04N 13/02* (2006.01)
    *H04N 13/04* (2006.01)

(52) U.S. Cl.
    CPC .............. *G06T 15/08* (2013.01); *H04N 13/026* (2013.01); *H04N 13/0459* (2013.01)

(58) Field of Classification Search
    None
    See application file for complete search history.

(56) References Cited

U.S. PATENT DOCUMENTS

| | | |
|---|---|---|
| 5,579,445 A | 11/1996 | Loce et al. |
| 6,031,564 A | 2/2000 | Ma et al. |
| 6,208,348 B1 | 3/2001 | Kaye |
| 6,515,659 B1 | 2/2003 | Kaye et al. |
| 6,686,926 B1 | 2/2004 | Kaye |
| 7,102,633 B2 | 9/2006 | Kaye et al. |
| 7,116,323 B2 | 10/2006 | Kaye et al. |
| 7,116,324 B2 | 10/2006 | Kaye et al. |
| 2002/0048395 A1 | 4/2002 | Harmon et al. |
| 2007/0002151 A1 | 1/2007 | Ozaki |
| 2007/0097208 A1 | 5/2007 | Takemoto et al. |
| 2009/0195643 A1 | 8/2009 | Neuman |
| 2009/0244309 A1 | 10/2009 | Maison et al. |
| 2010/0034457 A1 | 2/2010 | Berliner et al. |
| 2011/0050864 A1 | 3/2011 | Bond |

*Primary Examiner* — Xiao M. Wu
*Assistant Examiner* — Nicholas R Wilson
(74) *Attorney, Agent, or Firm* — Marsh Fischmann & Breyfogle LLP; Kent A. Lembke

(57) ABSTRACT

A computer-based method for generating a stereoscopic image from a two dimensional (2D) image such as a 2D cell animation. An object is selected in the 2D image, such as an animated character, and is stored in memory as the base image. With an erosion engine, the selected object is eroded to generate a set of eroded versions of the base image corresponding to a number of erosion levels. Each erosion level image may be formed by eroding or removing a set of outer or edge pixels from the image on the prior level. The method continues with calculating a parallax shift value for each of the eroded versions of the base image. An alternate eye image is then generated by compositing the set of eroded versions along with the base image. The eroded versions are horizontally offset from the base image by the level-specific parallax shift values.

19 Claims, 6 Drawing Sheets

MEDIAL AXIS DECOMPOSITION OF 2D OBJECTS TO SYNTHESIZE BINOCULAR DEPTH

CROSS-REFERENCE TO RELATED APPLICATIONS

This application is a continuation-in-part of U.S. patent application Ser. No. 12/025,856, filed Feb. 5, 2008, which is incorporated herein by reference in its entirety.

FIELD OF THE DESCRIPTION

The present application relates, in general, to stereoscopic image projection, and, more particularly, to systems and methods for producing stereoscopic images for three-dimensional (3D) projection from a two-dimensional (2D) image source such as a 2D cell animation and/or a live action film.

BACKGROUND

Recently, there has been a renewed demand for 3D entertainment including movies, video games, animation, and the like that are displayed or projected in 3D format. The images or image frames used to produce such a 3D output are often called stereoscopic images or a stereoscopic image stream because the 3D effect is due to stereoscopic perception by the viewer. A frame is a single image at a specific point in time, and motion or animation is achieved by showing many frames per second (fps) such as 24 to 30 fps. Stereoscopic perception results from the presentation of two images or frames representing horizontally separated perspectives with one or more objects (or visible features of the objects) slightly offset to the viewer's left and right eyes. The amount of offset between the elements of left and right eye images determines the depth at which the elements are perceived in the resulting stereo image. An object appears to protrude toward the observer and away from the neutral plane or screen when the position or coordinates of the left eye image are crossed with those of the right eye image (e.g., negative parallax). In contrast, an object appears to recede or be behind the screen when the position or coordinates of the left eye image and the right image are not crossed (e.g., positive parallax).

Many techniques have been devised and developed for projecting stereoscopic images to achieve a 3D effect. One technique is to provide left and right eye images for a single, offset two-dimensional image and displaying them alternately, e.g., using 3D switching or similar devices. A viewer is provided with liquid crystal shuttered spectacles to view the left and the right eye images. The shuttered spectacles are synchronized with the display signal to admit a corresponding image one eye at a time. More specifically, the shutter for the right eye is opened when the right eye image is displayed and the liquid crystal shutter for the left eye is opened when the left eye image is displayed. In this way, the observer's brain merges or fuses the left and right eye images to create the perception of depth.

Another technique for providing stereoscopic view is the use of anaglyph. An anaglyph is an image generally consisting of two distinctly colored, and preferably, complementary colored, images. The theory of anaglyph is the same as the technique described above in which the observer is provided separate left and right eye images, and the horizontal offset in the images provides the illusion of depth. The observer views the anaglyph consisting of two images of the same object in two different colors, such as red and blue-green, and shifted horizontally. The observer wearing anaglyph spectacles views the images through lenses of matching colors. In this manner, the observer sees, for example, only the blue-green tinted image with the blue-green lens, and only the red tinted image with the red lens, thus providing separate images to each eye. The advantages of this implementation are that the cost of anaglyph spectacles is lower than that of liquid crystal shuttered spectacles and there is no need for providing an external signal to synchronize the anaglyph spectacles. In other 3D projection systems, the viewer may be provided glasses with differing polarization such that the alternating right-left eye images are seen with the appropriate eye based on the displayed stereoscopic images having appropriate polarization. Other devices have been produced in which the images are provided to the viewer concurrently with a right eye image stream provided to the right eye and a left eye image stream provided to the left eye. Still other devices produce an auto-stereoscopic display via stereoscopic conversion from an input color image and a disparity map, which typically has been created based on offset right and left eye images. While these display or projection systems may differ, each typically requires a stereographic image as input in which a left eye image and a slightly offset right eye image are provided to create a presentation with the appearance of depth.

Digital animation that has been modeled in 3D can readily be converted into stereo or into stereoscopic image streams by filming or shooting the previously rendered frames or shots with a set of stereo cameras (e.g., a left eye camera and a horizontally offset right eye camera). However, there are a large number of 2D animated movies and other 2D media such as live action footage or motion pictures available for use in creating 3D entertainment such as 3D animated films. For example, traditional 2D cell animation has largely migrated to or been converted to the digital world, and the image levels to be composited into a final image have been stored either in bitmap, vector, or a hybrid format. This is true regardless of whether the drawings were initially created using a computer or on conventional media that was later digitized through scanning or other methods. The availability of the animation and other image sources in this digital form lends itself toward generating a stereoscopic image from the 2D or monoscopic image, but existing 2D-to-3D methods have not been widely accepted by the entertainment industry.

There are a number of methods presently used to transform flat or 2D drawings or images into 3D images. One method may be thought of as the horizontal shift method and involves isolating several important objects in the image field and shifting these objects horizontally. The shifted image is presented as an alternate eye view to the primary or original eye view, and a depth is perceptible due to the shifted or offset objects. The result has not been entirely successful, though, with many believing that 2D cell animation should not be transformed into and released as a 3D product using this method because the objects lack volume or individual depth and appear to be cardboard cutouts or flat objects presented in distinct planes (e.g., similar to a pop up book or the like in each frame). Other algorithms are available that address this problem by applying the 2D image such as a 2D drawing as a surface onto a 3D model. Unfortunately, the success of this technique depends on the creation of an accurate 3D model, and the results are often less than desirable. These and other features of modeling tools have proven complex and difficult to use as well as being relatively costly and time consuming.

Hence, there remains a need for methods for transforming flat or 2D objects into 3D objects for use in creating stereoscopic images. Preferably, such methods would provide a relatively automated technique for creating an alternate eye image useful for providing objects that appear to have volume or individual depth as well as providing a depth perception to a viewer (e.g., do not appear as mere planar objects or cardboard cutouts).

SUMMARY

The present application addresses the above problems by providing methods and systems for synthesizing an alternative eye image from a two dimensional (2D) or flat image such as a digitized 2D cell animation or live action film. The methods include applying a series of erosion algorithms to the pixel arrays or vector graphics representations of one or more objects in the digitized 2D image. Each selected object may be isolated to provide a base or original image of the object, and the erosion algorithms function to synthesize a plurality of images by sequentially eroding the base image (e.g., by eroding away an edge of the image by removing edge pixels or moving the edge vector mapping in by a preset distance). A parallax shift value is calculated for each of these erosion-generated images such as by using a contour or profile and a maximum disparity (e.g., a circular profile and a number of pixels of horizontal offset allowed).

The original 2D image or the base image may be used as the primary eye image of a stereoscopic image pair, and an alternate eye image is generated by combining or compositing the images from each erosion level with the base image, with each erosion level image offset from the base image by the level-specific parallax shift values. The alternate eye image may be either the left eye image or the right eye image that is then used in some cases with the primary eye image (which would be the opposite eye in this pair for a 3D display). In other cases, though, the process is repeated to generate an additional alternate eye image, and the two alternate eye images provide the left eye image and the right eye image for a left and right eye image pair for a 3D display.

In some alternative embodiments, a three dimensional (3D) model is created by skinning the erosion level shapes to form a computer generated (CG) mesh onto which the original or base image is projected, and a stereo pair may be created by imaging the 3D model with an alternate eye camera. In some display or projection systems, a color image along with a disparity map is used to provide stereoscopic images. To support these systems (e.g., autostereoscopic systems or the like), the method may include assigning a pixel value to each erosion level that is proportional to a desired parallax shift and then creating a disparity map by compositing the erosion levels. The original 2D image along with the disparity map may be used for stereoscopic conversion and/or display purposes.

More particularly, a computer-based method is provided for generating a stereoscopic image from a two dimensional (2D) image such as a 2D cell animation image or a frame from a live action film. The method includes receiving or retrieving a digitized 2D image from memory for use as a primary eye image of a stereoscopic image pair. Based on user input that may be received via a conventional user input device, an object is selected in the 2D image. For example, a user may select a character or object that can be provided depth and, significantly, volume so that it will not appear as merely a flat object on a differing plane. The selected object is stored in memory as the base or source image for later erosion steps. With an erosion engine or logic that may be run by a processor or CPU, the selected object is eroded to generate a set of eroded versions of the base image corresponding to a number of erosion levels.

For example, each erosion level image may be formed by eroding or removing a set of outer or edge pixels (in embodiments where the base image is an array of pixels or a bit map image) from the image on the prior level (with the base image being on the base or origin level). If the base image is in vector graphics image format, the erosion may include displacing the edge inward a particular distance or shrinking the edge-defining vectors a particular percent to create an eroded image for each erosion level. The method continues with calculating a parallax shift value for each of the eroded versions of the base image. An alternate eye image is then generated and displayed and/or stored in memory.

Generation of this image includes combining or compositing the set of eroded versions of the base image together with the base image. Typically, each of the eroded versions is horizontally offset relative to the base image by a corresponding one of the parallax shift values. The parallax shift values differ for each of the erosion levels ranging from zero at the base level to a maximum or overall parallax shift value or disparity set at a default value or by user input (e.g., less than about 6 pixels or other useful value). Of course, the shift value at the base does not have to be zero. There would be a particular parallax value associated with an object, i.e., its "base" parallax, that may be a positive or a negative value or zero depending upon its location in depth. From the base value, processing would add (or subtract depending upon whether there is a convex or a concave profile) a value representing the "volumetric" parallax offset within the object. The equation or logic used to determine the parallax value is determined based upon this overall parallax value and also upon a desired profile for these parallax shift values such as a circular profile, a linear profile, a curved profile such as an elliptical profile, a sinusoidal profile, or any other useful profile for modeling the shape and depth of a particular selected object. The primary eye image and the alternate eye image may be used as a stereoscopic pair to provide a stereoscopic image or image stream when there are a plurality of such stereo pairs (e.g., by presenting one image to the left eye of a viewer and the other image to the right eye in a switched or concurrent manner).

According to another aspect of the application, a computer readable medium such as software or logic stored in a storage media is provided for transforming a 2D image into a 3D image. The computer readable medium includes code or logic that causes a computer to display a digitized 2D image on a monitor and to process user input that selects an object or element within the displayed 2D image. Code may also be included to cause the computer to perform medial axis decomposition of an image of the selected object, and the decomposition may be completed sequentially or stepwise through a number of erosion levels to produce an image based on the selected object image (e.g., containing a set of pixels of the selected object image when this image is an array of pixels) for each of the erosion levels. The computer may further store the selected object image and the created erosion level images in memory. Additional code may cause the computer to determine a parallax shift value for each of the erosion levels based on a parallax shift profile (e.g., a circular profile, a linear profile, or the like) and an overall parallax shift value (e.g., less than about 8 pixels or less than about 4 to 6 pixels or other desired depth for the object). Code may also cause the computer to create an alternate eye image for the displayed 2D image by compositing the erosion level images and the selected object image, with each image being horizontally offset from the selected object image by a level-specific one of the parallax shift values. Decomposition or erosion may include identifying edges and moving the edge inward toward the medial axis, such as by identifying and removing edge pixels or moving an edge defined by vectors inward a preset or calculated distance.

According to another aspect of the invention, a system is provided for generating a stream of stereoscopic images. The system includes a memory or storage device that stores a number of digitized images each including at least one 2D object (e.g., frames from a live action film, images from a 2D animation, or the like with a character or other element for which depth and volume may be desired). A processor or CPU is provided for accessing or controlling the memory device and also for running or implementing code or programming logic. The system includes a binocular depth synthesizer that is implemented by the processor to erode each of the 2D objects in a stepwise or level-by-level manner to create for each of the digitized images a set of erosion level images in which edge portions (such as a set of edge pixels) of a preceding one of the images have been removed. A compositing engine is implemented by the processor to combine for each of the digitized images the erosion level images along with the 2D objects to form an alternate eye image of each of the 2D objects.

The system may further include a stereoscopic display device that displays the digitized images and a corresponding one or paired one of the alternate eye images to a viewer such that the viewer sees the digitized images with one of their eyes and the alternate eye images with the other eye (e.g., one with their left eye and one with their right eye). The binocular depth synthesizer may calculate a parallax displacement for each of the erosion level images (e.g., ranging from zero for the 2D object up to an overall parallax shift value and calculated to fit a parallax shift profile which may be a curve such as a circle, an arc, or the like), and the compositing may include shifting each of the erosion image levels based on the parallax displacement calculated for that particular level. By combining the generation of images by eroding a flat image of an object and then combining the images over the flat image at a particular displacement, the composited images form an alternate eye image that has both depth and volume.

DETAILED DESCRIPTION

Figure 1:
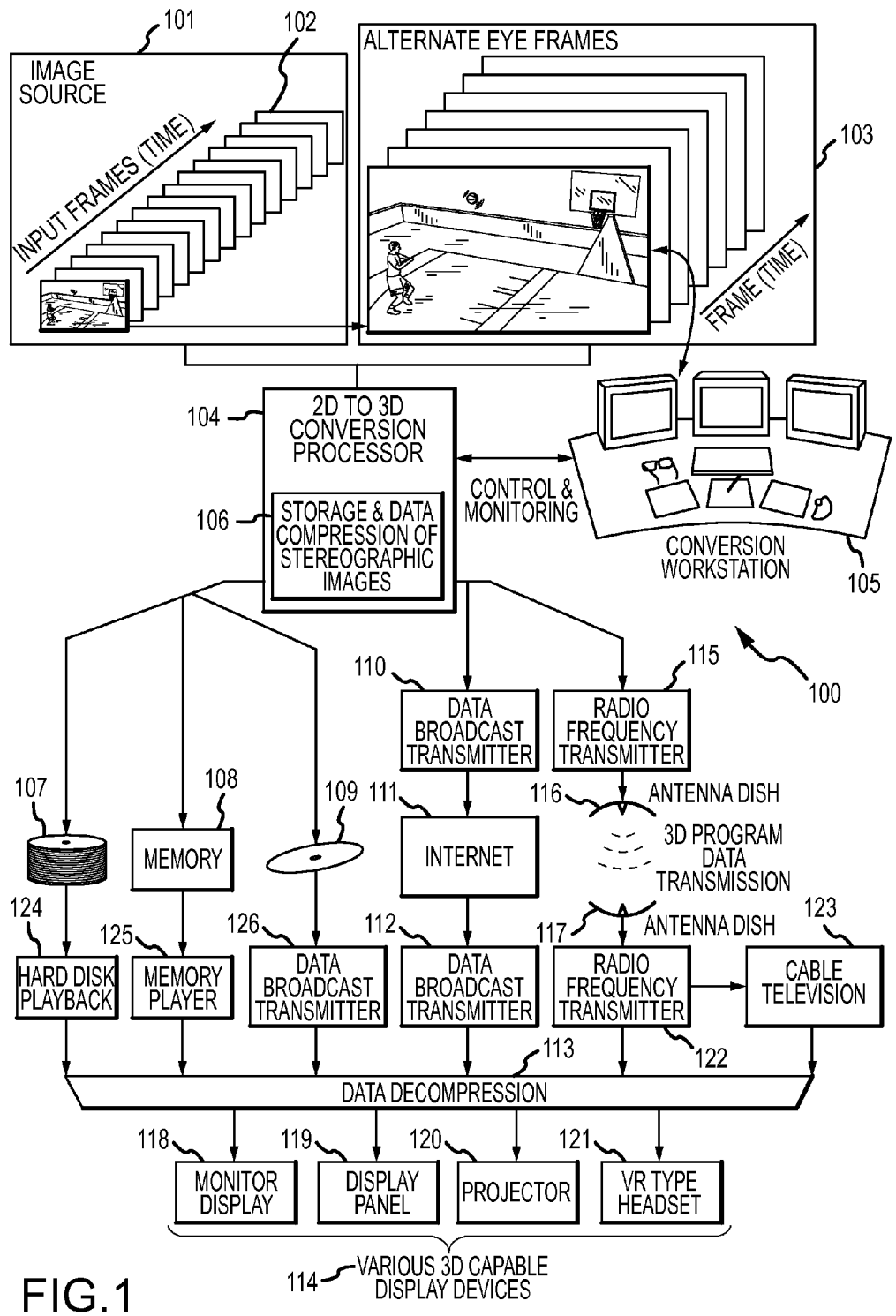
FIG. 1 is an embodiment of a 2D-to-3D conversion and distribution system showing input or original digitized images or frames that are processed by erosion techniques described herein to generate an alternate eye image or frame for a stereoscopic image stream or source.

Briefly, embodiments of the present description are directed to methods and systems for transforming a 2D image or image stream into a 3D image or image stream. Generally, the methods and systems are adapted to take as input a 2D image or frame and to synthesize or create binocular depth. This is achieved by allowing one or more objects such as a character in the 2D image to be selected and isolated (if necessary such as may be the case for a motion picture frame). An erosion algorithm is then applied to the selected object(s) to form a number of eroded images from the original image of the object, and a parallax shift (or horizontal offset) is then set or calculated for each erosion level. The images from each erosion level are composited by applying each progressive layer to a preceding layer with the calculated parallax shift for that level, and the result is an alternate eye image of the selected object, which can be used by positioning in the original frame to form an alternate eye image of the source frame. In some cases, the "base" shift value may be added to the "volumetric" shifts for each level (or, alternatively, the levels could be composited with only the volumetric shifts calculated from the profile applied) and then, the resulting object may be shifted by the "base" amount.

The original 2D image or frame may be designated as a primary eye image and the newly created image or frame with the composited object(s) is designated as the alternate eye image. These two images can then be used together to provide a stereoscopic image or image stream (e.g., by switching between the images or providing one image to the left eye and one image to the right eye or by use of another stereo display or projection technique). In such cases, the alternate eye image may be either the left or the right eye image in a pair of left and right images for a 3D display or image stream. In other cases, though, the process may be repeated to generate an additional or second alternate eye image so that both a left eye image and a right eye image are generated as such newly create images or frames, and these two alternate eye images are used together to provide a 3D display (e.g., a pair of left and right images in a 3D video stream or the like).

Traditional 2D cell animation has largely migrated to the digital world. Specifically, the images are stored in a bitmap, vector, or hybrid format, regardless of whether the drawings were initially created on the computer or on conventional media that was subsequently digitized. In some cases, the digitized images are image levels that are ready to be composited into a final image, and the erosion process discussed herein can be applied to each of these image levels prior to compositing. The availability of the animation in these digital forms lends itself to the 2D-to-3D conversion process of the application that includes an automated technique for generating the alternate eye image stream for a stereoscopic version of the digitized work. The same technique could also be applied to elements or objects in digital live action footage, in which the element to be converted to stereo has been isolated by rotoscoping, keying, or other matte extraction techniques.

The techniques described by this description involve applying a series of erosion algorithms to a 2D element or object in a scene or image that is to be converted to stereo. Each subsequent erosion level is horizontally shifted by a user-defined contour function, that assigns a pixel offset value (or parallax shift value that may be in pixels, subpixels, or other horizontal distance measurement units) based upon the numerical order of the erosion level (e.g., the further an erosion level is to the base or original image or erosion level the greater its parallax shift). Again, the "base" shift value may be added to the volumetric shifts for each level, as discussed above, and then the resulting object may be shifted by the selected base amount. This function may be normalized to the degree of the final erosion level so that an overall parallax shift or maximum desired disparity for the element will be realized at this level. Each displaced erosion layer is then composited over its predecessor to create the alternate eye image for stereo. A stretching/blending algorithm could be used to fill any gaps or seams created by the displacements or the underlying pixels may be used (e.g., ignore the pixels in the gap or seam and show the ones from lower erosion levels).

The process of transforming a 2D image into an alternate eye image with binocular depth including use of an erosion algorithm will typically be implemented through the use of a computerized workstation with associated software, hardware, and memory for storing source images (e.g., primary eye images), images in process (e.g., images from various erosion levels), and alternate eye images after compositing. Further, the primary and alternate eye images may be used in combination to provide stereographic images that may be stored, transmitted, and/or displayed or projected using digital communication networks, compression techniques, and any of a number of conventional 3D-capable display/projection devices. Hence, before discussing specific implementations of processes for performing a conversion of a 2D object to a 3D object for use in forming an alternate eye image, it may be useful to describe representative networks, computer systems, storage devices, software, and other tools useful for implementing embodiments of the application.

FIG. 1 illustrates a representative 2D-to-3D conversion and distribution system 100 such as may be used by an animator, stereo film producer, or the like to convert animation, motion pictures, or other 2D image sources into stereoscopic images or image streams by producing a plurality of alternate eye images for use with a primary eye image (or pairs of alternate eye images (i.e., left and right images created by the processes described herein)). The system 100 includes an image source 101 such as one or more memory devices or servers storing digitized input frames 102 (e.g., 2D cell animation, frames of motion pictures, and the like) that may be ordered by time (and/or by composite level) or the order they are to be displayed in a stream. For example, an industry standard may call for 24 frames per second to be shown in a typical animated film or work and the frames 102 may be stored in memory of image source 101 in this order or with an identifier indicating in which order they are to be displayed.

A 2D-to-3D conversion processor 104 is included (e.g., one or more processors or CPUs running graphics and other software including the erosion and other algorithms described herein, e.g., run to provide the processes described with reference to FIGS. 3-6). The 2D-to-3D conversion processor 104 functions to process all or a subset of the input frames or images 102 to produce alternate eye frames or images 103 (e.g., a right eye image to correspond to each of the left eye images 102, a left eye image to correspond to each of the right eye images 102, or right and left eye frames/images 103 that provide a left and right eye image pair of a 3D display (with the primary image not being presented to the viewer in this case)) such as by using medial axis decomposition to provide binocular depth to one or more objects or elements in the alternate eye frames 103. The specific algorithms implemented by the processor 104 are described in detail below.

Conversion workstation 105 may provide control and monitoring of the operation of the processor, which may include a user (e.g., an animator or stereo producer) operating or interacting with 3D graphics system that may implement a binocular depth synthesizer (and/or an erosion engine), a render and compositing engine, and a stretching/blending module as well as using a user interface to input information such as selection of a flat or 2D object (e.g., a character) to process to produce an alternate eye image and such as maximum parallax shift values and erosion contour profiles. Again, some embodiments will utilize the base offset processing discussed above. In the illustrated exemplary system 100, the 2D-to-3D conversion processor 104 is implemented and controlled by a user working at a conversion workstation 105. At the workstation 105, the user may access an interactive user interface and image processing tools and may, in some embodiments, control and monitor the results of the 2D-to-3D conversion processor 104 (e.g., as it runs an erosion algorithm including selecting objects to process). It should be understood that the functions implemented by the 2D-to-3D processor 104 may be performed by one or more processors/controllers. Moreover, these functions can be implemented employing a combination of software, hardware and/or firmware taking into consideration the particular requirements, desired performance levels, and the like for a given system or application.

The workstation 105 may include multiple monitors, three-dimensional glasses, and one or more user input mechanisms such as a keyboard, a mouse or trackball, drawing tablet(s), and a drawing pen. The workstation 105 may also include a processor that provides signals to the monitors, controls the visual displays at these monitors, and receives and processes user inputs provided to the system via the user input mechanisms, e.g., controls the interactive interface or the like. The processor may provide, in conjunction with the three-dimensional glasses, when the glasses are synchronized to a signal from the processor, a three-dimensional image at an application monitor, which is updated to allow the user to observe changes in the depth or placement of various objects within the composited alternate eye image. In some embodiments, an object selection monitor may be employed to display the primary eye or source images to allow selection and/or isolation of objects or elements within the displayed images. The processor/controller 104 is programmed to allow the user to select objects within images and to initiate a binocular depth synthesizer that uses an erosion engine to automatically create an alternate eye image using the data in the original image and converting the selected object into a 3D object or object with depth, e.g., via a plurality of interactive tools that allow a user to provide input such as selecting a contour function (e.g., one based on a sphere, a linear function, a sinusoidal function, or the like) and a maximum desired parallax shift value (e.g., a "base" value or the like).

The primary eye images and the alternate eye images (e.g., the converted product including the original frames and original frames with objects having synthesized binocular depth) and their associated working files may be stored during storage and data compression 106 performed by processor 104. In some cases, the primary eye images are not used in the display of a 3D image and pairs of alternate eye images are generated and stored (i.e., plurality of left and right eye images generated from the original frames). The images or files may be stored on hard disk, on tape, or on any other form of data storage. In the interest of conserving space on the abovementioned storage, the digital data of the images may be compressed; otherwise, file sizes can become large, especially when dealing with a full-length animated work. Data compression also may be desired when the information passes through a system with limited bandwidth, such as a broadcast transmission channel.

The primary and alternate eye images (or stereoscopic images) can be stored in many forms. The image data can be stored on a hard disk 107 such as for hard disk playback 124, in removable or non-removable memory 108, such as for use by a memory player 125, or on removable disks 109, such as for use by a removable disk player 126, which may include but is not limited to digital versatile disk (DVD) players. The primary and alternate eye images (or stereoscopic images) can also be compressed into a bandwidth necessary to be transmitted by a data broadcast receiver 110 across the Internet 111 or other digital communications network, and then received by a data broadcast receiver 112 and decompressed (e.g., via data decompression 113), making it available for use via 3D-capable display devices 114.

Similar to broadcasting over the Internet, the primary and alternate eye images or the pair of left and right eye images generated according to this description (or stereoscopic images) created by the methods described herein can be transmitted by way of electromagnetic or RF (radio frequency) transmission by a radio frequency transmitter 115. This includes direct conventional television transmission as well as satellite transmission employing an antenna dish 116. The images can also be transmitted by satellite and received by an antenna dish 117, decompressed, and viewed on a monitor display 118, possibly incorporating a cathode ray tube (CRT), a display panel 119 such as a plasma display panel (PDP) or a liquid crystal display (LCD), a front or rear projector 120 in the home, industry, or in the cinema, or a virtual reality (VR) headset 121. If the stereoscopic images are broadcast by way of RF transmission, the receiver 122 feeds a display device directly. Another use for the stereoscopic images produced by the inventive processes is distribution via cable television 123.

Figure 2:
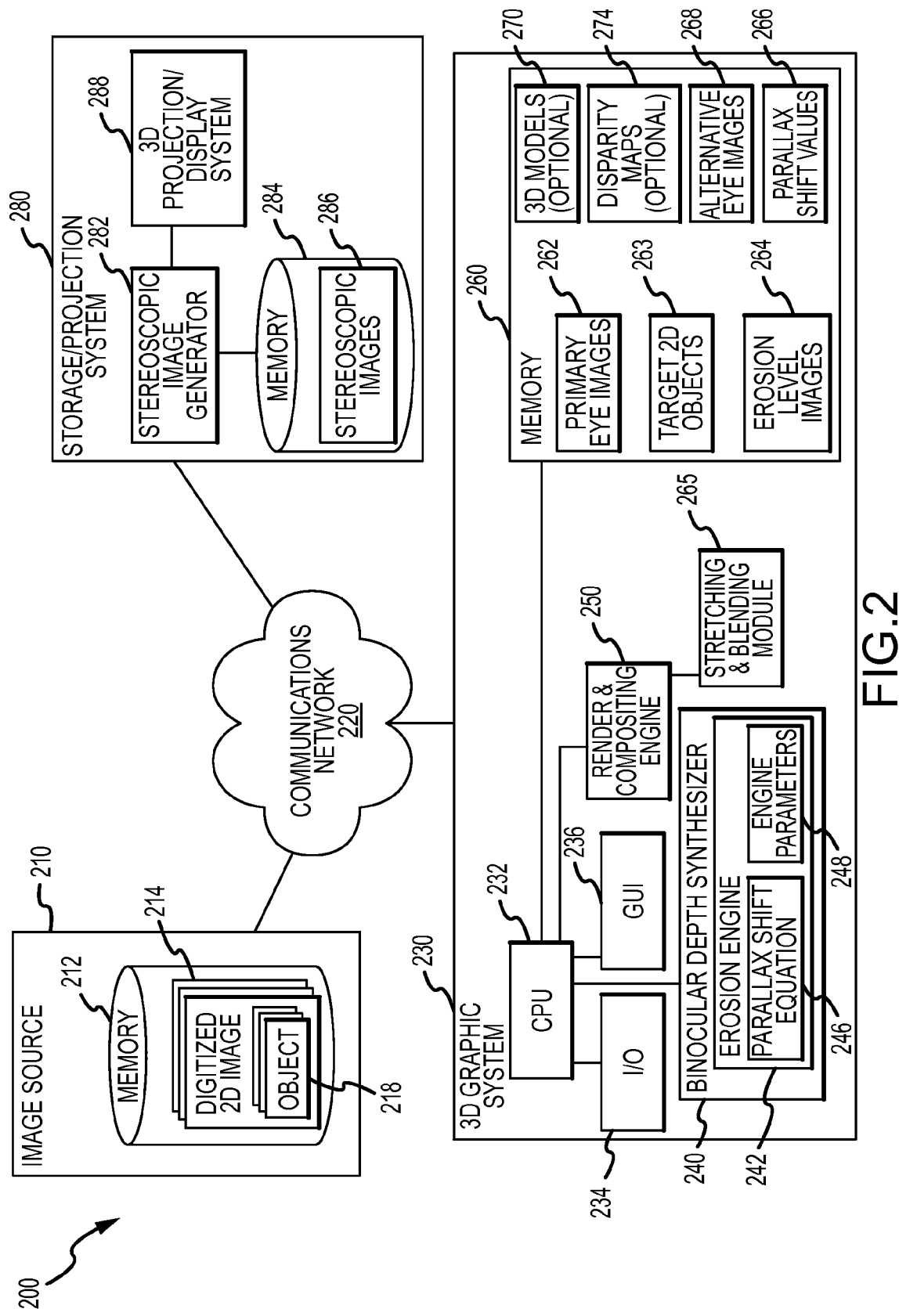
FIG. 2 is a functional block diagram of a 2D-to-3D conversion system including a 3D graphics system with a binocular depth synthesizer to produce alternate eye images or frames from 2D or flat images or frames (e.g., create 3D objects from 2D objects that can be used in 3D projection)

FIG. 2 illustrates a functional block diagram of a stereoscopic image stream production system 200 of one embodiment of the application that may be used to implement all or portions of the system 100 of FIG. 1. As shown, the system 200 includes an image source 210, such as a server, that is linked to a digital communications network 220, such as the Internet, a local area network, a wide area network, or the like. The source 210 includes a memory device 212 storing a plurality of digitized 2D images 214 such as frames from an animated work, a live action movie, or the like. To create a stereoscopic image from a flat or 2D image, the methods described herein generally include selecting one or more characters, elements, or features (i.e., "objects") in one or more of the frames or images 214 to which binocular depth as well as volume will be provided. In other words, objects 218 in the 2D images such as a particular character can be chosen and provided depth by providing an alternate eye image (with the original image 214 being linked to the synthesized image as the corresponding primary eye image). This is achieved not just by applying a horizontal shift to the object 218 as was done in prior systems because this results in flat, cardboard images that appear to be in differing planes (like a pop up book). Instead, each object is eroded through a number of levels (e.g., by applying medial axis decomposition or the like) and then the images from each of these erosion levels are combined or composited to provided volume to the image. Further, the object is provided in an alternate eye view by shifting each of these levels by a level-specific parallax shift (or horizontal offset), e.g., a "base" offset or the like. Such processing may be performed to generate just a left or a right eye image for use with a primary eye image or to generate both a left and a right image for use together as a pair (of alternate eye images).

The system 200 includes a 3D graphics system 230 that may be a single computer workstation (such as described in relation to FIG. 1) or one or more computers, data storage devices, and peripheral devices that are communicatively linked. The graphics system 230 typically would at least include a CPU 232 that controls operation of the system 230 including operation of one or more input/output (I/O) devices 234 such as keyboards, touch screens, mice, voice controlled software/interfaces, and the like as well as a GUI 236. These two components 234, 236 are configured to allow a user or operator (such as an animator) to provide user input such as selecting an input 2D image stream 214, select objects 218 for processing, and provide parameters 248 for use in synthesizing binocular depth according to embodiments of the application.

The graphics system 230 further includes memory 260 (which may also be provided separately from system 230 and accessed over the network 220 or another communications link (not shown)). As a user selects input or source images 214 for processing, these images 262 are stored in memory 260 and identified as primary eye images for use in creating a stereo stream (e.g., to provide the right or left eye image for the left or right alternate eye image). In other cases, though, the primary eye images are not used in the display and a pair of left and right eye images is instead generated for delivery to a viewer's left and right eyes. Also, the operator of the graphics system 230 may select objects 218 via I/O 234 and/or GUI 236, and these target 2D objects 263 or images selected for erosion or decomposition are stored in memory 260 for use by a binocular depth synthesizer 240. The objects 218 may be identified by a boundary (e.g., a number of transparent pixels) or be provided on separate levels (e.g., a number of images 214 may be composited to form a single frame). In other cases, the objects 218 may have to be isolated prior to storage 263 such as by use of rotoscoping, keying, or other matte extraction techniques such as when the images 214 are frames of a digital live action footage.

The graphics system 230 includes a binocular depth synthesizer 240 run by the CPU 232 to synthesize a 3D image from the 2D images 262 or, more particularly, to form 3D objects from the target 2D objects 263. To this end, an erosion engine 242 is provided that applies one or more erosion algorithms to the target 2D objects 263 to form a plurality of images 264 that are stored in memory 260. The images 264 are the resulting images from each level of erosion performed by the erosion engine 242. For example, each erosion process or step by the engine 242 on a 2D object 263 (that is a bitmap or a two-dimensional rectangular array of data elements or pixels) may involve removing all outer edge pixels such as by identifying and removing each pixel that has at least one side that is adjacent to a blank pixel. Alternatively, the target 2D object 263 may be stored in vector format or vector graphics image, and the erosion engine 242 may perform a stepwise erosion by mapping the outer edge or boundary inward toward the medial axis a particular distance (e.g., an erosion setting stored as an engine parameter 248). Regardless of the erosion technique utilized, the resulting images 264 from each erosion level including the base or original image of the object are stored in memory 260.

The erosion engine 242 or another component of the synthesizer 240 is then used to calculate parallax shift values (or amounts of horizontal offset) for each of these erosion levels or erosion level images 264 according to a parallax shift equation or module 246. The original or source image of the 2D object is not shifted relative to the medial axis so this value would be zero for this level. The parallax shift values 266 for this base or source level are stored in memory 260 as they are calculated according to the shift equation 246. As discussed below with reference to FIG. 4, the shift equation 246 is generally selected or derived based on two parameters (which may be stored as engine parameters): a contour or profile for the synthesized 3D object and a maximum shift or disparity. For example, the profile may be circular such that the created image is developed to project out from the base image as half of a sphere or as a semi-spherical shape. When the image is a bitmap, the disparity may be set to 1 to 10 pixels (or some sub-pixel value in some cases) such as 4 pixels in some embodiments or other useful disparity value for a particular application with the particular value used not being limiting to the application. With these settings, the parallax shift values 266 associated with each erosion level (or erosion level image) will range from 0 to 4 pixels. The direction of the shift will depend upon whether the synthesizer is generating a right or left eye image and whether it is desired to create positive or negative parallax (e.g., the shift value may be a positive or negative value to practice the application). In some embodiments, either a right or a left eye image is formed for use with a primary eye image while in other cases both right and left eye images are formed for use together as a stereoscopic image pair.

The binocular depth synthesizer 240 then may form alternate eye images 268 by calling a render and compositing engine 250 (or the engine 250 may form the images 268 with data generated by the synthesizer 240). In one embodiment, the synthesizer 240 forms the alternate eye images 268 by compositing the set of erosion level images 264 with each image being horizontally offset by the previously calculated parallax shift values 266, which differ for each level or image. In this manner, the target 2D object 263 is provided with volume as well as depth. The final alternate eye image 268 may also include the other data or images from the primary eye image 262 (such as background drawings) as well as other objects that have been processed as target 2D objects to form 3D objects. In some cases, a stretching and/or blending module 256 is provided to fill gaps or seams between successive level images caused by the displacements of the images 264. Stretching and blending between objects is known in the animation industry, and any of a number of known or later developed techniques may be used to smooth the transition between two images. In other embodiments, the compositing is performed without such stretching/blending and underlying pixels are used to form the alternate eye image 268.

Once the alternate eye images 268 are generated, the system 200 may be operated to produce, distribute, and display/project 3D or stereo images or image streams. In this regard, the system 200 includes a storage and/or projection system 280 linked to the 3D graphics system 230 via the communications network 220. The primary eye images 262 and alternate eye images 268 (or first and second (left and right) alternate eye images 268 when the primary eye image 262 is not used in the display) may be transferred via the network 220 to the storage/projection system 280 (or placed on one or more storage media that, in turn, is provided to the system 280). The images 262, 268 are used with or without further processing to form stereoscopic images 286 by the stereoscopic image generator 282 (e.g., one or more software, hardware, and/or firmware devices) and are stored in memory 284. The images 286 may then be projected or displayed via 3D projection/display system 288, which may include one or more of the display and/or projection devices shown in FIG. 1 (and/or the distribution devices or media). The generation of the images 286 often will vary based on the type of the display system 288 utilized to create a 3D work for an audience. For example, the images 286 may be colored or polarized in a particular manner to allow an audience to view the images 286 in an alternating or switching right/left sequence corresponding to the created primary and alternate eye images 262, 268. Alternatively, the stereoscopic images 286 may include a color image (such as the primary eye images) and a disparity map for some projection systems.

With such projection systems 288 in mind, the 3D graphics system 230 may be configured to use the binocular depth synthesizer to form disparity maps 274. In these embodiments, a pixel value may be assigned to each erosion level. The pixel value may be proportional to a desired parallax value 266 for that level. The erosion levels or their images 264 may then be composited to create a disparity map 274 that could then be passed to the projection system 280 for use in stereoscopic conversion or display purposes.

In other embodiments, the synthesizer 240 is further operable to generate 3D models 270 of the target 2D objects 263 by using the erosion level images 264. In some of these embodiments, the erosion level shapes are skinned, by any of a number of common programs, to form a computer generated (CG) mesh. Then, the original image 263 is projected onto the CG mesh to form the 3D model. This 3D model may then be used to film the frame or shot in stereo such as with two offset cameras to create a stereo pair of images (e.g., a left and a right eye image that are provided to stereoscopic image generator 282 for display/projection). The 3D models 270 may be also be used for generating other 3D works or product.

Figure 3:
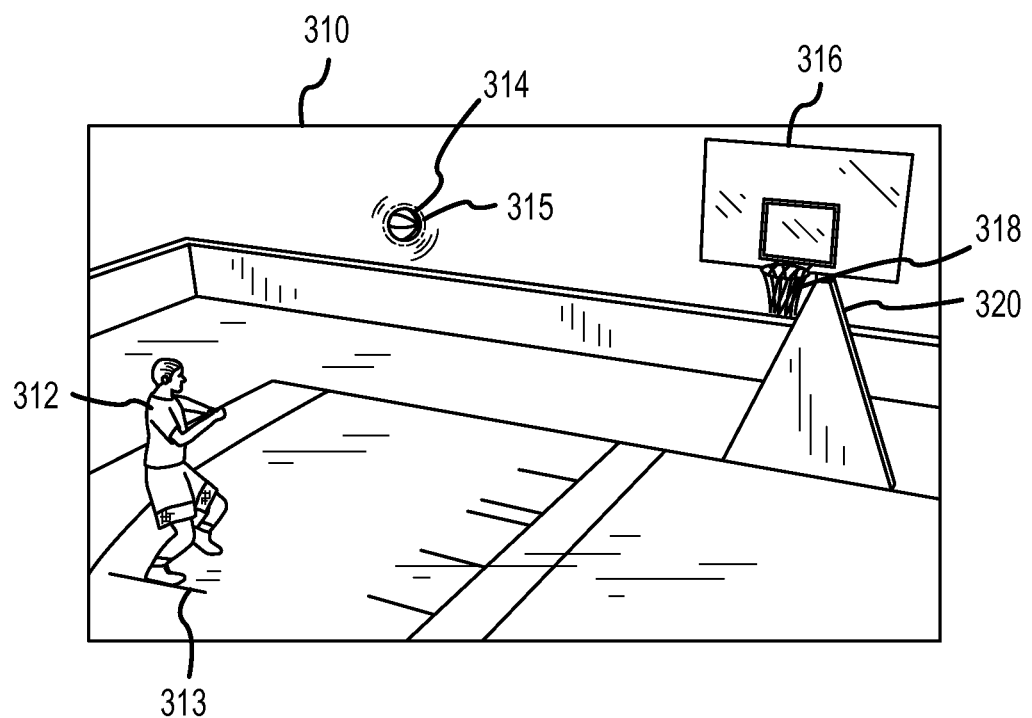
FIG. 3 illustrates a source frame, which may be a digitized 2D drawing (e.g., 2D cell animation), a frame of a live action shot or motion picture, or other non-3D image, that includes several flat or 2D objects that may be selected for medial axis decomposition to synthesize binocular depth for the image.

With the systems 100 and 200 understood, it may now be useful to discuss an exemplary erosion process that may be used to create an alternate eye image such as a left or a right eye image (or to convert a 2D image to a 3D image). FIG. 3 illustrates a source image 310 such as a 2D cell animation or a frame from a motion picture or live action work. The image 310 is 2D and includes a number of flat objects or elements 312, 314, 316, 318, and 320 (e.g., a basketball player, a basketball, a backboard, a frame, and a post). In creating or synthesizing a 3D image from image 310, it is desirable to select one or more of the objects 312-320 for which binocular depth is to be provided by the methods described herein. For example, it may be useful to select the player or character 312 and provide a parallax shift such that the player appears in the foreground or is pulled forward from other objects such as the backboard 318 and ball 314. As will be discussed with reference to FIG. 6, it is sometimes desirable to select or tag edges such as the edge or contact line 313 where the player 312 contacts the floor. These tagged shear edges 313 are then used in performing the erosion such that a portion of the shear edge 313 is included in each image level (e.g., each image level will include at least a pixel at the shear edge 313 and pixels extending to the medial axis), which avoids issues with "floating" of objects or characters. For illustration purposes, the following discussion assumes that the ball 314 is selected as a target 2D object for use in the erosion process. As shown, this may involve selecting the object's boundary 315, or other isolation or object identification techniques may be used to isolate a selected object such as the ball 314.

Figure 4:
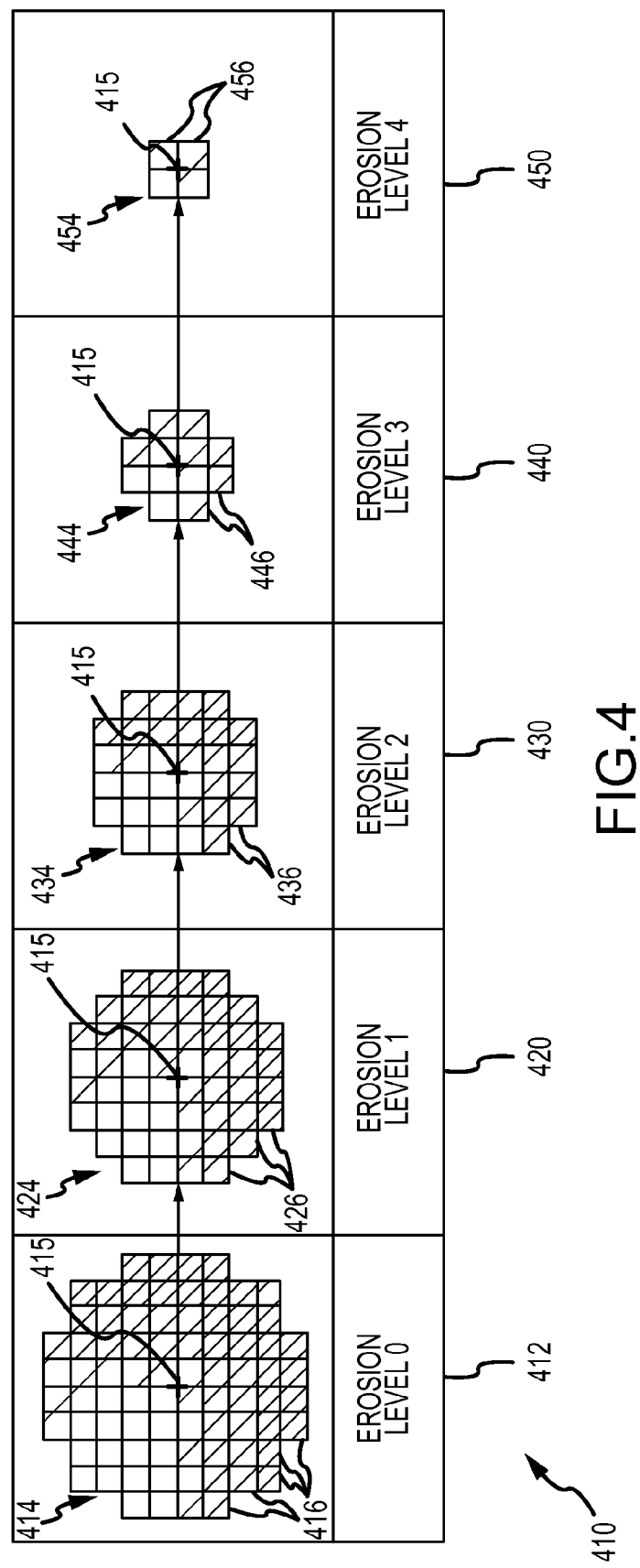
FIG. 4 illustrates an erosion of a digital image of a flat or 2D image, e.g., medial axis decomposition of a 10 by 10 pixel image of a sphere such as the ball shown in FIG. 3 that may be selected for use in creating depth in the illustrated source image or frame.

FIG. 4 illustrates an erosion process (or medial axis decomposition) 410 of a sphere 414 such as the ball 314. For the illustrated process 410, the source object image 414 is assumed to be provided with a 10×10 pixel image, e.g., a relatively low resolution sphere. As shown, the process 410 involves eroding the image 414 through a number of levels or erosion processes. In the illustrated case, there are five erosion levels 412, 420, 430, 440, and 450 including the base or original image level (e.g., "Level 0"). As shown, the sphere image 414 is provided in or as an array of 10×10 pixels with a medial axis 415 and a number of edge pixels 416.

The erosion process involves applying a series of erosion algorithms to the 2D sphere 414 to produce the levels 420, 430, 440, and 450. As shown, the erosion algorithm is applied to the base or origin level 412 and identifies and removes edge pixels 416 to produce the first erosion level 420 with the eroded image 424 of the sphere, which is presented in an 8×8 pixel image or array. Identification of edge pixels may be performed in a number of ways such as by identifying all pixels with at least one adjacent blank pixel. The erosion algorithm is applied again to identify and remove edge pixels 426 to produce a second erosion level 430 with the eroded image 434 of the sphere, which is now presented in a 6×6 pixel image or array. The erosion algorithm is repeated again to identify and remove edge pixels 436 to produce a third erosion level 440 with the eroded image 444 of the sphere, which is now presented in a 4×4 pixel image or array. Erosion is performed again to identify and remove edge pixels 446 to produce a fourth erosion level 450 with the eroded image 454. The erosion process ends at this point determines that the 4×4 pixel image 454 has edge pixels 456 but further erosion is not appropriate as it would remove all pixels of the sphere image 454. Hence, the erosion process at this point (i.e., a four step or four level erosion process). The erosion process can also be configured to handle images in vector graphics format, and erosion would then involve identifying the edge of the image at each level and moving the edges inward a particular distance toward the medial axis.

Continuing with the example of the 10×10 pixel image of the sphere, the maximum erosion level is a fourth level. The parallax shift for each level (or for each erosion level image during compositing) may be determined in a number of ways and based on a variety of parameters (default or user provided). For example, the parallax shift may be determined in part based on the number of erosion levels or steps such that the maximum erosion level or $E_{max}$ may be set at 4 in this example. A default profile or contour for the path of the parallax shifts may be used, or a user may be allowed to select this profile. In many applications, it may be desirable to use a circular profile or other curved profile such as a defined arc, elliptical shape, or the like. But, in other cases, differing profiles may be used, such as a linear profile, a sinusoidal profile, or other shape. A default overall parallax shift or disparity or user input value is also used in determining the parallax shift in each erosion level (again, the use of a "base" offset may be used in the processing as described above). For example, the overall shift may be set at 0 to 10 or more pixels (or a similar range for vector graphics shifting) with shifts of about 4 to 6 pixels being used in some implementations. With a circular profile, the parallax shift equation may be:

$$D = D_{max} * \mathrm{sqrt}(E_{max}^2 - (E_{max} - E)^2) / E_{max}$$

where "D" is the level-specific parallax shift, "D." is the overall parallax shift (e.g., 4 pixels or some other useful value), "E" is the erosion level, and "$E_{max}$" is the greatest erosion level (e.g., 4 in this example). This would result in the following parallax shifts for the erosion levels in the illustration of FIG. 4:

| Erosion Level | Parallax Displacement |
|---|---|
| 0 | 0.00 |
| 1 | 0.66 $D_{max}$ |
| 2 | 0.87 $D_{max}$ |
| 3 | 0.97 $D_{max}$ |
| 4 | 1.00 $D_{max}$ |

If $D_{max}$ is set at 4 pixels, the parallax displacement at each level is 0 at the base or origin level, 2.64 pixels at the first erosion level, 3.48 pixels at the second erosion level, 3.88 pixels at the third erosion level, and 4.00 at the fourth and final erosion level. The shift is typically measured from the medial axis of each of the images and is horizontal.

Again, edges can be tagged as being a shear, such as where a character contacts a ground plane or where such an object touches a surface, such as the ground or a table top or the like. The pixels may be considered exempt from the erosion process or, more typically, the erosion algorithm will only erode pixels in this edge as necessary to avoid isolating the pixels or shear edge (e.g., the pixels are not eroded until isolated or have no other tagged pixels or surfaces).

Figure 5:
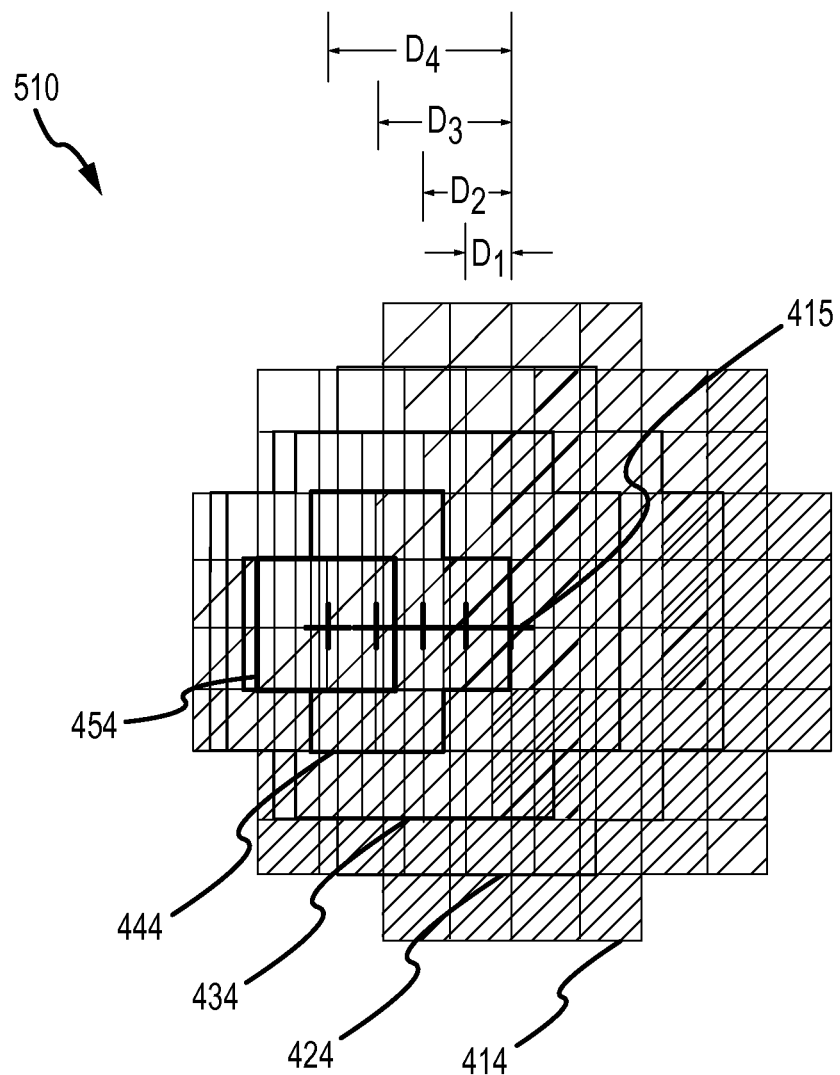
FIG. 5 illustrates a 3D image or alternate eye image created by compositing the images formed at each level of erosion in the process shown in FIG. 4 with each image being positioned at calculated parallax shift or offset to provide an alternate eye image.

FIG. 5 illustrates the creation of an alternate eye image 510 of the sphere that was subjected to the erosion process 400. Specifically, the image 510 is created by placing each erosion level image 414, 424, 434, 444, 454 over its predecessor and then compositing the image 510. The calculated, level-specific parallax shifts (as shown with D1 to D4) are used to determine the position of each of the images 424, 434, 444, 454 relative to the base or source image 414. If desired, a stretching and/or blending program may be used to account for gaps or seams created by the shifting or this may be ignored, and the pixel underneath the shifted image may be used in the alternate eye image 510. The illustrated shift is to the left of horizontal (e.g., to create a right eye image with the source or primary image used as the left eye image of a stereo pair), but the shift could also have been to the right (e.g., to create a left eye image with the primary image being used as the right eye image of a stereo pair), which corresponds to negative or positive parallax shifts. Further, a left eye image and a right image may be generated and used together to provide a stereo pair (without use of the primary image in this example).

Figure 6:
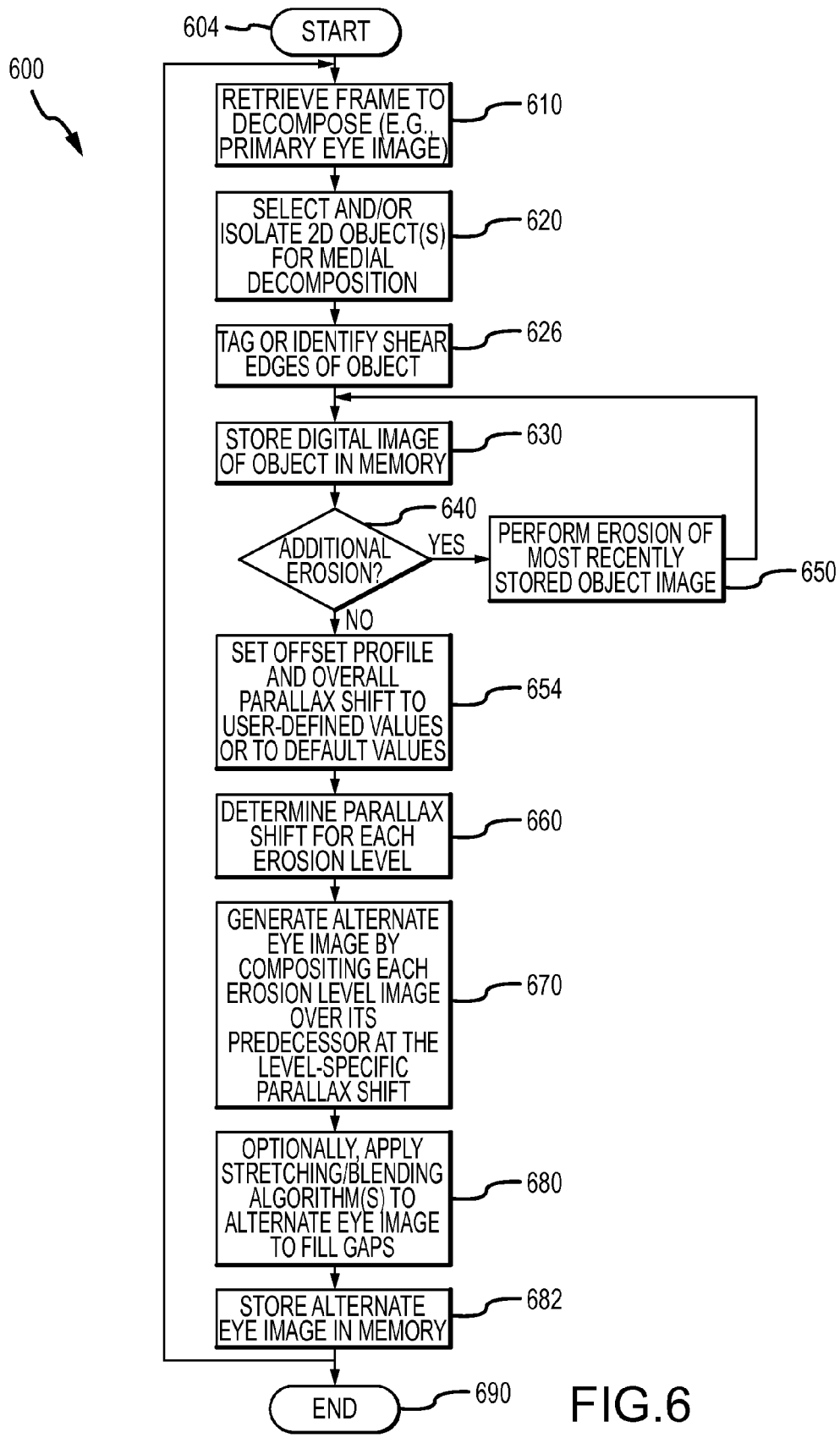
FIG. 6 is a flow chart of a method of generating alternate eye images from a source image or frame (e.g., from a 2D original image that is then used as or stored as a primary eye image such as the left eye image with the alternate eye image being used as the right eye image or vice versa).

FIG. 6 illustrates a method 600 of generating an alternate eye image for use in creating a stereo pair of images and/or creating a stereoscopic image or image stream. The method 600 will typically be implemented by using one or more computers or computer systems such as shown in FIGS. 1 and 2 with processor and workstation 104, 105 and with 3D graphics system 230, respectively. The method 600 starts at 604 typically with the selection of a 2D work such as an animated film or a live action film for conversion into 3D or stereo. Step 604 may also include loading software such as an erosion engine onto a computer and in some cases loading and setting default parameters for use by the erosion engine or other programs.

The method 600 continues at 610 with retrieving an image or frame to decompose. This image may be stored in memory as the primary eye image (or the color image when the image is displayed with an auto-stereoscopic projecting system). At step 620, one or more 2D objects are selected and/or isolated for medial axis decomposition or erosion. The objects may be nearly any flat element but often will include the characters (e.g., human characters, animals, fantasy creatures, and the like). The method 626 continues with the optional step of tagging or identifying shear edges of each selected object, and these shear edges are processed differently than other edges as these are eroded only as they become isolated and not merely when they are identified as edges.

The method 600 continues at 630 with storing the digital image of the object in memory, e.g., as the base or source level image of the erosion process. At 640, a determination is made as to whether additional erosion should occur, e.g., by determining that a next erosion will not remove all pixels or will not displace the edges beyond a medial axis or center point in vector graphics. If more erosion is possible, a next erosion is performed at 650 upon the most recently stored image (e.g., the base image in a first pass), and the eroded image is stored at 630. The determination 640 and erosion 650 are continued until all pixels would be removed or, in some cases, the determination at 640 may be based on a desired number of erosion steps (e.g., a maximum number of erosion steps may be set such as 3 to 8 or more erosion steps or levels). Each eroded image or image associated with each erosion level is stored in memory via step 630.

At 654, the method 600 continues with setting or selecting an offset profile or contour and a maximum or overall parallax shift value. These may be set initially to default values (e.g., a circular shift profile or path and a shift of a particular number of pixels or the like) and, in some embodiments, the default values may be adjusted or new values input by a user. At 660, the parallax shift for each erosion level is calculated (e.g., see the exemplary equation provided above with a circular profile) using the set profile to select the parallax shift equation and using the overall parallax shift. At 670, the alternate eye image is generated by compositing the images from each erosion level over their predecessors and with the shift from step 660. For example, the first erosion level is composited over the base or source level image, the second erosion level is composited over the first erosion level, and so on. Step 680 may be performed separately or in conjunction with step 670 to fill gaps or seams caused by the shifting of the images from one level to the next. At 682, the generated alternate eye image is stored in memory. The method 600 may continue with a next image or frame from the source file at 610 or end at 690.

Although the application has been described and illustrated with a certain degree of particularity, it is understood that the present disclosure has been made only by way of example, and that numerous changes in the combination and arrangement of parts can be resorted to by those skilled in the art without departing from the spirit and scope of the application, as hereinafter claimed.

For example, the methods were described mainly for use with pixel rendering, but the concepts also work well with sub-pixel rendering and such applications are considered within the breadth of the description and the following claims. Sub-pixel rendering would provide increased quality in the results by providing more effective erosion layers for a smoother resulting image.

Also, the concept of tagging can readily be expanded to non-shear portions of an image. For example, tagging may be utilized for other rates of erosion or for two or more erosion rates. One erosion rate may be a default erosion rate, such as one pixel per erosion level, while the other may be a different rate. In the case of shear tagging, the second erosion rate may be zero pixels per erosion level, but, in other cases, it may be useful to tag an edge for a different second erosion rate such as an erosion rate between one and zero per erosion level (e.g., such as erode one pixel for every four levels for a particular tagged edge). In this manner, particular edges can be eroded at one or more rates that differ from the default or main erosion rate, and in some embodiments, a rate is assigned to each tagged edge (e.g., shear rate, one pixel per every 2 to 8 or more levels, or another rate useful for a particular application).

In the above description, a method is taught (which may be implemented in computer readable program code causing a computer to perform the methods) for transforming a 2D image into a 3D image. The method includes performing medial axis decomposition of an image of an object within a digitized 2D image. The decomposition is sequentially performed through a plurality of erosion levels and produces an image based on the selected object image for each of the erosion levels. The method includes storing in memory the object image and the erosion level images. The object image may be an array of pixels, and the medial axis decomposition may include identifying and removing edge ones of the pixels in the array beginning with the selected object to form a next one of the erosion level images. The method further includes determining a parallax shift value for each of the erosion levels, and then creating an alternate eye image to the displayed 2D image by compositing the erosion level images and the object image. The erosion level images are typically horizontally offset from the selected object image by a corresponding one of the parallax shift values.

In this method, the parallax shift value for each of the erosion levels can be determined based on a parallax shift profile and an overall parallax shift value. The parallax shift profile may be an arcuate profile, and the overall parallax shift values is sometimes less than about 8 pixels. The pixel erosion does not need to be uniform in all directions, and, in the method, the medial axis decomposition can be horizontally biased, vertically biased, or biased at an angle such that pixels are eroded faster along one or more dimensions. Further, sub-pixel erosion may be performed instead of or in addition to full pixel erosion. Hence, in performing the method, all or a subset of the erosion level images may be formed by removing portions (sub-pixels) of the edge pixels in the array to use sub-pixel erosion to create the alternate eye image (left eye image or right eye image or both).

To better understand the use and aspects of this method, it may be useful to further describe medial axis techniques that can be used for stereoscopic extraction. To perform stereoscopic conversion of a 2D animated film, the inventors developed extensions and improvements to medial axis techniques. Distance transforms, directional influences, and segmentation variations were used with medial axis skeletonization to automatically generate depth maps from the hand-drawn, 2D images. Overall, the methods significantly reduced the amount of manual rotoscoping and modeling that would have been required using a traditional stereoscopic conversion process.

Briefly, the stereoscopic conversion may involve defining a depth map such as one where white pixels are closer to the viewer and black pixels are farther away. Given the distance between two cameras and their convergence angle, an invertible set of functions can be derived between depth maps, displacement maps, physical geometry, inter-ocular maps, and final stereoscopic images.

In computer graphics, the medial axis is a common technique to procedurally calculate skeletal structure from a volumetric region. For example, the Pfaltz and Rosenfeld definition (from 1967) may be used for the medial axis, MA, of a shape, S, described as the set of points that lie at the center of all maximally inscribed circles in the shape, S (i.e., all points equidistant to at least two closest points along the perimeter of the shape, S). A medial axis computation of color regions facilitates generation of depth maps and, ultimately, a stereoscopic image. A first step of this process may include partitioning the original image into segmented regions, $S_i$. This can be done manually via rotoscope techniques or programmatically by defining a threshold over red, green, blue, alpha, or luma color channels. Once appropriate regions have been defined, a medial axis, $MA_i$, is constructed through each segmented region, $S_i$.

The stereoscopic conversion may then continue with defining a distance transform for the medial axis skeleton. The borders of a segmented region, $S_i$, can be likened to the seam of a MYLAR® balloon, where minimum inflation exists along the edges and maximum inflation at the medial axis, $MA_i$. The depth value of all intermediate pixels can be defined by an interpolation function that achieves the desired contour from edge to center. The profile of this curve can be linear (e.g., for regions with sharp peaks), convex (e.g., for areas that bow outward), or concave (e.g., for sections that bend inward). Depth gradation is heavily based on the choice of curvature, so the interpolation function should be judiciously defined.

With regard to directional influence or bias, a traditional medial axis is based on a symmetrical inward traversal from the shape periphery. This definition can be extended to accommodate cases where it is beneficial to influence this computation in a particular direction. For example, a character's face may benefit from a gradual rounding around the cheeks (or sides) and an abrupt fall off near the forehead and chin (or top and bottom). In this example, the medial axis definition may be modified to inscribe ellipses in a segmented region, $S_i$, with a short vertical axis and a long horizontal axis (e.g., to provide horizontal directional influence), which may provide an ideal skeletal structure.

Other scenarios, though, may benefit from ellipses with a short horizontal axis and a long vertical axis to provide vertical directional influence. Further, thin and pointed areas (e.g., a pointy nose on a character's face or a pointed tree branch) may be better fitted with an ellipse that is rotated about its center to capture the region's narrow shape as well as its upwards (or downwards) tilt (e.g., to provide bias at an angle). As the character or other object in an image is animated over time, the best (or preferred) direction influence or bias for a segmented region, $S_i$, may differ among frames and even be different for every frame in some cases. Thus, it may be useful to animate the inscribed shape to capture the salient geometric features of each pose of the character or object in the image.

With regard to segmentation variation, one of the key aspects to generating a successful or useful depth map is the combination of large segmentation regions and small, localized details. A large area, such as a character's alpha mask, produces a good general rounding of the entire figure when inflated to its medial axis. To extract interior details, the image can be analyzed by its color channels, which allows the ink lines to form segmentation boundaries. Individually, the global extraction may be too general while the local extraction may be too extreme. However, a more desirable result may be produced using the local extraction as a detailed displacement map on top of the global extraction.

The above description provides examples of processes or techniques that can be used to create a 3D image based on erosion of a base image. Generally, the stereo conversion method is used to generate a 3D image based on a set of erosion level images (and, in some cases, a base or selected object image that may be used as the primary eye image). A depth representation may be formed from the erosion level images, and this depth representation can then be used to map the original image pixels to new horizontal locations that create one or more alternate eye images.

In a particular example, the 3D image is generated by converting the erosion level images into a depth map and by mapping the array of pixels to horizontal locations using the depth map to create an alternate eye image. In another case, though, the 3D image is generated by converting the erosion level images into a point cloud representation of the depth map and by mapping the array of pixels to horizontal locations using the individual point depths to derive pixel locations in an alternate eye image. In another implementation, the 3D image is generated by converting the erosion level images into a displacement map and by mapping the array of pixels to horizontal locations using the displacement map to create an alternate eye image. In other cases, the 3D image is generated by converting the erosion level images into a level set and by mapping the array of pixels to horizontal locations using the level set to create an alternate eye image.

Further, the above description teaches generating an alternate eye image or images to be used in providing a left and right eye stereo pair. However, it will be apparent to those skilled in the art that the deliverable or product of the described processes may take other forms to suit a particular autostereoscopic display. For example, but not as a limitation, the erosion processes may be used to produce a depth map-based final deliverable for use with autostereoscopic displays, and this deliverable may include an image combined with a depth representation rather than a left eye/right eye stereo pair.

We claim:

1. A computer-based method for generating a three dimensional (3D) image from a two dimensional (2D) image, comprising:
   selecting an object in the 2D image;
   in memory, storing the selected object as a base image;
   with an erosion engine implemented by a processor, eroding the selected object to generate a set of eroded versions of the base image corresponding to at least two erosion levels, wherein each of the eroded versions is reduced in size relative to the base image and to a previous one of the erosion levels;
   operating the processor to generate an alternate eye image by combining the base image with the set of eroded versions of the base image;
   storing the alternate eye image in the memory for use in generating a 3D display; and
   determining a parallax shift value for each of the eroded versions of the base image,
   wherein each of the eroded versions of the base image is horizontally offset relative to the base image by a corresponding one of the parallax shift values, and each of the eroded versions of the base image is placed upon the base image or a preceding one of the eroded versions to generate the alternate eye image that is used in the 3D display.

2. The method of claim 1, wherein the alternate eye image is a left eye image or a right eye image that is used with a primary eye image of the digitized 2D image to provide the 3D display.

3. The method of claim 1, further comprising performing the eroding step, the operating step, the storing step, and the determining step to generate an additional alternate eye image, wherein the alternate eye image and the additional alternate eye image provide a left eye image and a right eye image paired for use in the 3D display.

4. The method of claim 1, wherein the parallax shift values differ for each of the eroded versions of the base image and is determined based on a curve profile traced by the parallax shift values and also is determined based on an overall parallax shift value for the alternate eye image.

5. The method of claim 4, wherein the overall parallax shift value is less than about 6 pixels.

6. The method of claim 5, wherein the overall parallax shift value is set based on user input received via the user input device.

7. The method of claim 1, wherein the base image comprises an array of pixels including edge pixels and wherein the eroding comprises removing the edge pixels from the base image to form a first of the eroded versions corresponding to a first one of the erosion levels and repeating the removing for each subsequent one of the erosion levels.

8. A non-transitory computer readable medium for transforming a 2D image into a 3D image, comprising:
    computer readable program code causing a computer to perform medial axis decomposition of an image of an object within a digitized 2D image, wherein the decomposition is sequentially performed through a plurality of erosion levels and produces an image based on a selected object image for each of the erosion levels;
    computer readable program code causing the computer to store in memory the object image and the erosion level images, wherein the object image comprises an array of pixels and wherein the medial axis decomposition comprises identifying and removing edge ones of the pixels in the array beginning with the selected object to form a next one of the erosion level images;
    computer readable program code causing the computer to determine a parallax shift value for each of the erosion levels; and
    computer readable program code causing the computer to create an alternate eye image to the displayed 2D image by compositing the erosion level images and the object image, the erosion level images being horizontally offset from the selected object image by a corresponding one of the parallax shift values.

9. The computer readable medium of claim 8, wherein the parallax shift value for each of the erosion levels is determined based on a parallax shift profile and an overall parallax shift value, wherein the parallax shift profile comprises an arcuate profile, and wherein the overall parallax shift values is less than about 8 pixels.

10. The computer readable medium of claim 8, wherein the medial axis decomposition is horizontally biased, vertically biased, or biased at an angle whereby pixels are eroded faster along one or more dimensions.

11. The computer readable medium of claim 8, wherein at least some of the erosion level images are formed by removing portions of the edge pixels in the array, whereby sub-pixel erosion is used to create the alternate eye image.

12. A non-transitory computer readable medium for transforming a 2D image into a 3D image, comprising:
    computer readable program code causing a computer to display a digitized 2D image on a monitor;
    computer readable program code causing the computer to process user input to select an object within the displayed 2D image;
    computer readable program code causing the computer to perform medial axis decomposition of an image of the selected object, wherein the decomposition is sequentially performed through a plurality of erosion levels and produces an image based on the selected object image for each of the erosion levels;
    computer readable program code causing the computer to store in memory the selected object image and the erosion level images, wherein the selected object image comprises an array of pixels and wherein the medial axis decomposition comprises identifying and removing edge ones or portions of the edge ones of the pixels in the array beginning with the selected object to form a next one of the erosion level images; and
    computer readable program code devices causing the computer to generate a 3D image based on the erosion level images,
    wherein the 3D image is generated by converting the erosion level images into a depth map and by mapping the array of pixels to horizontal locations using the depth map to create an alternate eye image.

13. A non-transitory computer readable medium for transforming a 2D image into a 3D image, comprising:
    computer readable program code causing a computer to display a digitized 2D image on a monitor;
    computer readable program code causing the computer to process user input to select an object within the displayed 2D image;
    computer readable program code causing the computer to perform medial axis decomposition of an image of the selected object, wherein the decomposition is sequentially performed through a plurality of erosion levels and produces an image based on the selected object image for each of the erosion levels;
    computer readable program code causing the computer to store in memory the selected object image and the erosion level images, wherein the selected object image comprises an array of pixels and wherein the medial axis decomposition comprises identifying and removing edge ones or portions of the edge ones of the pixels in the array beginning with the selected object to form a next one of the erosion level images; and
    computer readable program code devices causing the computer to generate a 3D image based on the erosion level images,
    wherein the 3D image is generated by converting the erosion level images into a point cloud representation of a depth map and by mapping the array of pixels to horizontal locations using individual point depths to derive pixel locations in an alternate eye image.

14. A non-transitory computer readable medium for transforming a 2D image into a 3D image, comprising:
    computer readable program code causing a computer to display a digitized 2D image on a monitor;
    computer readable program code causing the computer to process user input to select an object within the displayed 2D image;
    computer readable program code causing the computer to perform medial axis decomposition of an image of the selected object, wherein the decomposition is sequentially performed through a plurality of erosion levels and produces an image based on the selected object image for each of the erosion levels;
    computer readable program code causing the computer to store in memory the selected object image and the erosion level images, wherein the selected object image comprises an array of pixels and wherein the medial axis decomposition comprises identifying and removing edge ones or portions of the edge ones of the pixels in the array beginning with the selected object to form a next one of the erosion level images; and
    computer readable program code devices causing the computer to generate a 3D image based on the erosion level images,
    wherein the 3D image is generated by converting the erosion level images into a displacement map and by mapping the array of pixels to horizontal locations using the displacement map to create an alternate eye image.

15. A non-transitory computer readable medium for transforming a 2D image into a 3D image, comprising:
computer readable program code causing a computer to display a digitized 2D image on a monitor;
computer readable program code causing the computer to process user input to select an object within the displayed 2D image;
computer readable program code causing the computer to perform medial axis decomposition of an image of the selected object, wherein the decomposition is sequentially performed through a plurality of erosion levels and produces an image based on the selected object image for each of the erosion levels;
computer readable program code causing the computer to store in memory the selected object image and the erosion level images, wherein the selected object image comprises an array of pixels and wherein the medial axis decomposition comprises identifying and removing edge ones or portions of the edge ones of the pixels in the array beginning with the selected object to form a next one of the erosion level images; and
computer readable program code devices causing the computer to generate a 3D image based on the erosion level images,
wherein the 3D image is generated by converting the erosion level images into a level set and by mapping the array of pixels to horizontal locations using the level set to create an alternate eye image.

16. A system for generating a stream of stereoscopic images, comprising:
a memory device storing digitized images each including a 2D object;
a processor accessing the memory device and implementing logic;
a binocular depth synthesizer implemented by the processor to erode the 2D objects in a stepwise manner to create for each of the digitized images a set of erosion level images in which edge portions of a preceding one of the 2D object and the erosion level images have been removed;
a compositing engine implemented by the processor to combine for each of the digitized images the erosion level images with the 2D objects to form an alternate eye image of each of the 2D objects; and
a stereoscopic display device displaying the alternate eye images to a viewer,
wherein the binocular depth synthesizer calculates a parallax displacement for each of erosion level images and wherein the compositing engine combines the erosion levels with the 2D object by first displacing each of the erosion level images from the 2D object a corresponding one of the parallax displacements.

17. The system of claim 16, further comprising a user interface for receiving user input including selection of one or more edges of the 2D object as a shear edge and wherein the binocular depth synthesizer erodes the selected shear edges only when portions are isolated.

18. The system of claim 16, wherein the erosion of the 2D objects is performed with horizontal, vertical, or rotational directional influence.

19. The system of claim 16, wherein the erosion of the 2D objects is performed using sub-pixel erosion.

* * * * *